United States Patent
Beaucaire et al.

(10) Patent No.: US 7,168,304 B2
(45) Date of Patent: Jan. 30, 2007

(54) METHOD AND APPARATUS FOR INDICATING A POTENTIAL FLUID FILTER PROBLEM

(75) Inventors: James T. Beaucaire, Glen Ellyn, IL (US); Steven J. Dickerson, Lake In The Hills, IL (US); Michael A. Majewski, Joliet, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/696,831

(22) Filed: Oct. 30, 2003

(65) Prior Publication Data

US 2005/0092074 A1    May 5, 2005

(51) Int. Cl.
    *G01M 15/00*    (2006.01)
(52) U.S. Cl. .................................... 73/119 R; 73/117.2
(58) Field of Classification Search ................. 73/112, 73/113, 115, 114, 116, 117.2, 117.3, 118.1, 73/118.2, 119 R, 119 A; 340/438, 451; 116/DIG. 25, 116/DIG. 42
See application file for complete search history.

(56) References Cited

U.S. PATENT DOCUMENTS

| | | | |
|---|---|---|---|
| 4,621,335 A | | 11/1986 | Bluish et al. |
| 5,477,731 A * | | 12/1995 | Mouton .......................... 73/38 |
| 5,616,837 A * | | 4/1997 | Leonard et al. ........... 73/119 A |
| 5,681,988 A * | | 10/1997 | Koch et al. ................ 73/118.1 |
| 5,773,716 A * | | 6/1998 | Antonioli et al. ......... 73/119 A |
| 5,974,865 A * | | 11/1999 | Dambach ..................... 73/49.7 |
| 6,172,602 B1 | | 1/2001 | Hasfjord |
| 6,289,726 B1 * | | 9/2001 | Ferris et al. ............... 73/118.1 |
| 6,339,742 B2 | | 1/2002 | Weisman, II |
| 6,357,288 B1 * | | 3/2002 | Shigihama et al. ........ 73/118.1 |
| 6,371,092 B1 | | 4/2002 | Guglielmo et al. |
| 6,397,587 B1 * | | 6/2002 | van Nieuwstadt et al. .... 60/297 |
| 6,456,928 B1 | | 9/2002 | Johnson |
| 6,463,910 B2 | | 10/2002 | Nishiyama |
| 6,477,452 B2 | | 11/2002 | Good |
| 6,494,226 B2 | | 12/2002 | Tipton et al. |
| 6,564,616 B2 * | | 5/2003 | Antonioli et al. ............ 73/49.7 |
| 6,587,767 B2 | | 7/2003 | Letang et al. |
| 6,672,147 B1 * | | 1/2004 | Mazet ...................... 73/119 R |
| 2003/0196479 A1 * | | 10/2003 | Kasen et al. ............... 73/53.05 |
| 2004/0060343 A1 * | | 4/2004 | Amano et al. ............... 73/49.7 |
| 2004/0200457 A1 * | | 10/2004 | Gottemoller et al. ..... 73/119 A |

OTHER PUBLICATIONS

"Welcome to Davco Technology!—Fuel Filtration and Fuel Processing System," www.davcomfg.com, Davco Technology, 2000.
"Fleetguard Products," www.fleetguard.com/fleet/en/products/en_prod_fg_fuel.jsp, Fleetguard.

* cited by examiner

*Primary Examiner*—Eric S. McCall
(74) *Attorney, Agent, or Firm*—Elias P. Soupos; Susan L. Lukasik; Jeffrey P. Calfa

(57) ABSTRACT

A fluid pressure near a filter (103) is measured and compared (307) to a predetermined value that is based on one or more engine operating parameters. When the measured fluid pressure deviates enough from the predetermined value by an established amount, an indication of the deviation may be provided to notify of a potential problem with the filter (103), such as obstruction, restriction, or some form of clogging.

17 Claims, 2 Drawing Sheets

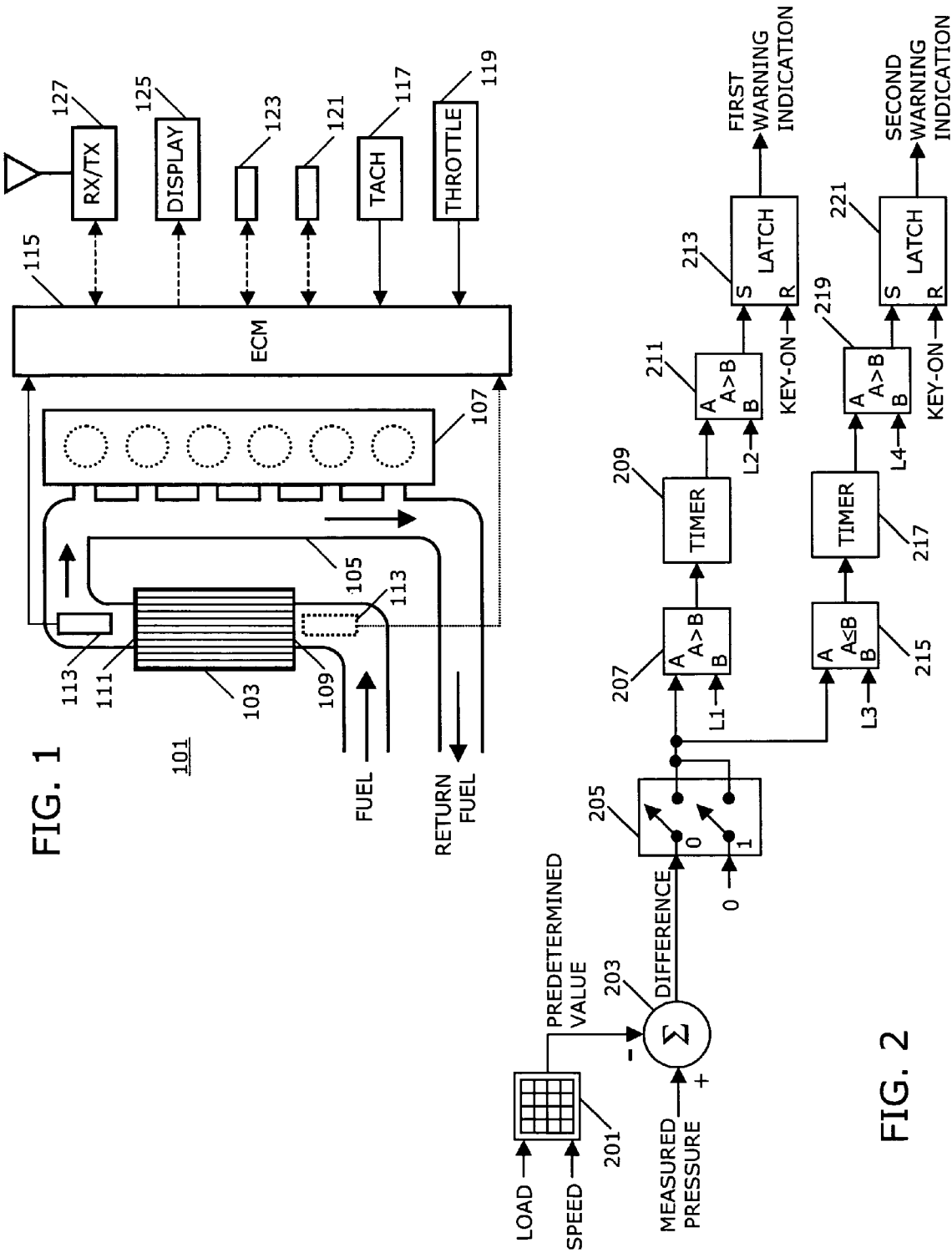

METHOD AND APPARATUS FOR INDICATING A POTENTIAL FLUID FILTER PROBLEM

FIELD OF THE INVENTION

The present invention relates to internal combustion engines, including, but not limited to, use fuel filter systems in an internal combustion engine.

BACKGROUND OF INVENTION

Contaminants may accumulate in internal combustion engine fuels, for example, during manufacture, storage, and handling of the fuel. Because the contaminants may damage the engine, they are separated from the fuel with a filter before the fuel is consumed in the internal combustion engine.

Typically, fuel is fed to an internal combustion engine by a fuel pump that draws the fuel from a storage tank. The fuel passes through a filter before entering the combustion chambers. As the fuel passes through the filter, contaminants in the fuel are separated from the fuel. After some time, if the filter is not replaced, the separated contaminants begin to clog the filter, and may eventually restrict fuel flow to the engine.

In order to maintain the desired engine performance, the fuel filter is ideally replaced before it so clogged or obstructed that the filter restricts the fuel flow to the engine. In addition, the filter is ideally replaced to prevent engine damage caused by contaminants that may pass through a clogged filter. Unfortunately, filter replacement, before a desired degree of clogging is reached, may result in both higher filter costs, and higher downtime expenses due to decreased equipment availability.

Accordingly, there is a need for a reliable and inexpensive fuel filtering system that detects filter clogging.

SUMMARY OF INVENTION

A method of and an apparatus for use with a filter in an internal combustion engine are provided. A fluid pressure near the filter is obtained and compared to a predetermined value that is based on engine operating parameters. An apparatus includes a filter in an internal combustion engine, a pressure sensor for sensing a measured fluid pressure near the filter, and an apparatus that determines the predetermined value based on at least one engine operating parameter and compares the predetermined value to the measured fluid pressure.

BRIEF DESCRIPTION OF THE DRAWINGS

FIG. 1 is a diagram of an internal combustion engine including a filter in accordance with the invention.

FIG. 2 is a logic diagram for use with a filtering system in accordance with the invention.

DESCRIPTION OF A PREFERRED EMBODIMENT

Figure 3:
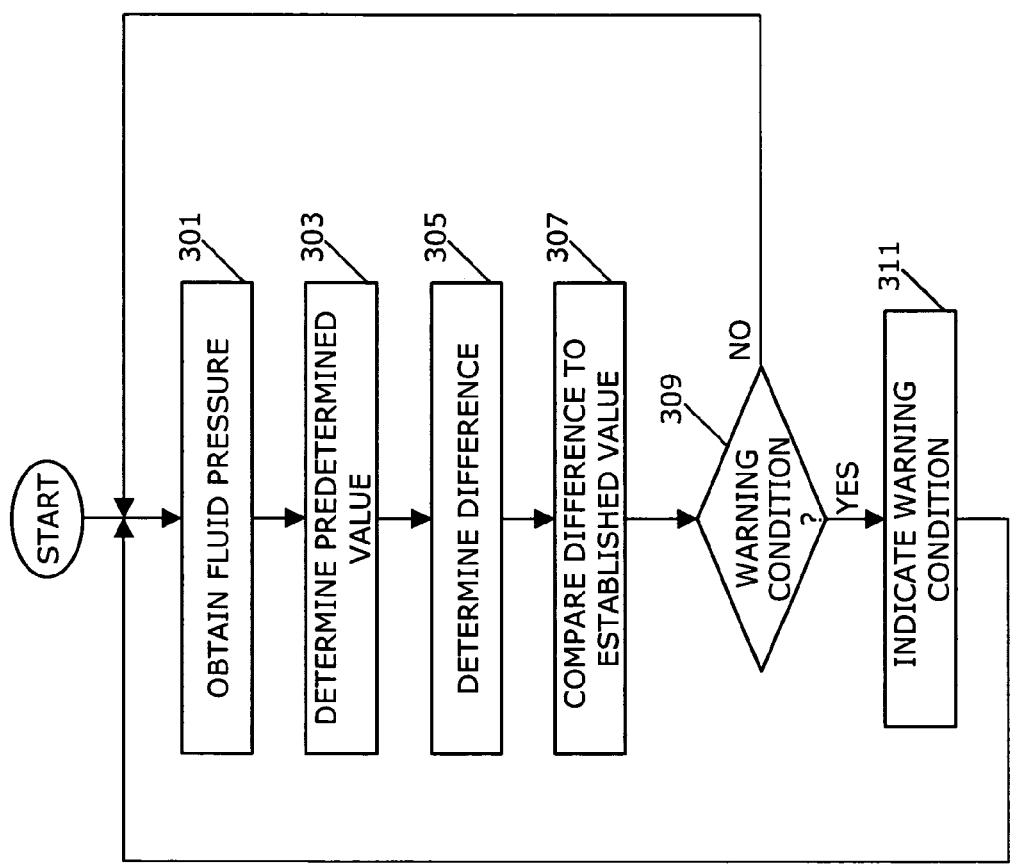
FIG. 3 is a flowchart illustrating a method for use with a filter in accordance with the invention.

The following describes a fuel filtering system for use with fluid filters in internal combustion engines. A fluid pressure near the filter is measured and compared to a predetermined value that is based on one or more engine operating parameters. When the measured fluid pressure deviates sufficiently from the predetermined value by a significant amount, an indication of the deviation may be provided to notify of a potential problem with the fuel/fluid or filter, such as obstruction, restriction, some form of clogging, and so forth.

A diagram of an internal combustion engine 101 is shown in FIG. 1. The fuel system of the engine 101 includes a filter 103 upstream of a fuel rail 105 that supplies fuel for combustion in the cylinder block 107. The fuel system provides fuel to the engine, typically through fuel injectors, and often includes a fuel tank (not shown) and a fuel pump (not shown). Fuel enters an inlet 109 of the filter 103 and exits through an outlet 111 of the filter 103. As the fuel passes through the filter 103, contaminants in the fuel are separated from the fuel and trapped in the filter 103. Unconsumed fuel may be returned to the fuel tank or recirculated to a suction of the fuel pump.

One or more sensors 113 are disposed near the filter 103. The sensors 113 are advantageously pressure sensors that are disposed in the fuel near the inlet 109 and/or outlet 111 of the filter 103. The sensors 113 provide data, such as measured fluid pressure, to an Engine Control Module (ECM) 115.

The ECM 115 is a microprocessor-based apparatus that provides various control functions for the engine 101 and/or the vehicle. The ECM 115 communicates with a tachometer 117, an engine sensor that may be attached to the engine crankshaft or camshaft, and a throttle 119 associated with the accelerator pedal (not shown). As known in the art, the ECM 115 may communicate with one or more engine sensors 121 to facilitate monitoring and control of the engine 101. In addition, the ECM 115 may communicate with one or more non-engine sensors 123, such as sensors connected to the transmission or other parts of the vehicle in which the engine 101 is housed.

The ECM 115 may communicate with a display panel 125, and/or a wireless transceiver 127 for the remote transmission and reception of communication signals that may include operational data for the vehicle.

A logic diagram for use with a filtering system is shown in FIG. 2. The logic may be implemented in software executed by the ECM 115. As shown in FIG. 2, two engine operating parameters, engine speed and engine load, are input to a determiner 201. Engine speed and load are either measured or calculated values. Engine speed is typically conveyed in revolutions per minute (rpm), which may be measured by the tachometer 117. Alternatively, non-engine sensors, as may be utilized with a transmission, may be used indirectly to calculate engine speed. The load for an engine may be an inferred or calculated value that is related to engine torque or power. Engine torque or power may be related to various engine factors, such as the flow of fuel to the engine or the fuel demanded by the operator of the vehicle. Engine load may be calculated from an engine sensor, such as the throttle 119. Alternatively, non-engine sensors, such as accelerator pedal position, may be used to indirectly calculate engine load.

The output of the determiner 201 is a predetermined value based on the determiner 201 inputs. The predetermined value may be determined from a table that relates the predetermined value to the engine speed and load. For example, the table may be calibrated for a particular type of engine by performing one or more tests with engines, such as commercially produced engines, on a dynamometer or other device. During the tests, filter inlet or outlet pressures are measured while the engines operate across a desired range of speeds and loads. For various engine speed and load conditions, predetermined values based on the measured pressures are found and calibrated into a table, such as shown in Table 1 below. Alternatively, predetermined values may be calculated by an empirical equation that correlates the predetermined value with engine load and engine speed. Similar to table calibration, the empirical equation may be derived for a particular type of engine by correlating data from engine tests. For example, engine tests that determine predetermined values based on measured pressures over a range of engine speeds and load may be used to mathematically determine an equation where predetermined values are calculated from variables of engine speed and load.

TABLE 1

| | | LOAD (CUBIC MILLIMETERS OF FUEL PER STROKE) | | | | |
|---|---|---|---|---|---|---|
| | | 20 | 40 | 75 | 100 | 120 |
| Engine | 700 | 65 | 65 | 65 | 65 | 65 |
| SPEED | 1000 | 65 | 64 | 62 | 62 | 62 |
| (RPM) | 1400 | 65 | 62 | 60 | 60 | 60 |
| | 2000 | 65 | 60 | 56 | 54 | 54 |
| | 2300 | 65 | 58 | 52 | 50 | 50 |

While the engine 101 operates, the ECM 115 obtains engine speed and load values that the determiner 201 utilizes to determine the predetermined value for the filter 103. The predetermined value values, as shown in Table 1, are advantageously pressure values having the same unit of measurement as the measured pressure input to the combiner 203, e.g., pounds per square inch, which may optionally be consistent with the unit of measure utilized by the pressure sensor(s) 113.

Alternatively, the ECM 115 may employ other information, including other engine sensor 121 and/or non-engine sensor 123 outputs to determine the predetermined value. For example, fuel temperature may be utilized because it affects fuel physical properties, such as viscosity and pour point of fuel. Fuel temperature may be measured by engine sensors 121, such as a temperature sensor in the fuel line, or non-engine sensors 123, such as a temperature sensor in the fuel tank.

A measured pressure value, as may be derived from or taken from the sensor(s) 113, and the predetermined value from the determiner 201 are input to and combined by the combiner 203. Although the predetermined value is shown being subtracted from the measured pressure, the measured pressure may alternatively be subtracted from the predetermined value, and the rest of the logic is modified accordingly. The combiner 203 output, a difference value, is input to a switch 205. The output of the switch is the difference value when the switch control is "0" and a zero signal when the switch control is "1." The switch control is typically a "0" when the engine is operating normally, and is a "1" otherwise, for example when the engine is not operating, when a sensor is malfunctioning, and so forth.

The switch 205 output is input to a first comparator 207, which compares the switch output, typically the difference value, to a first limit, L1. When the switch output is greater than L1, the first comparator 207 outputs a "1" that initiates a first timer 209. The first timer 209 stops when a "0" is output from the first comparator 207, indicating that the switch output is no longer larger than L1. The output from the first timer 209 is a first run-time, the length of time the first timer 209 was on, i.e., had an input of "1." The output of the first timer 209 is input to a second comparator 211 that compares the first run-time to a second limit, L2. When the first run-time is greater than L2, the second comparator 211 outputs a "1" that sets latch 213 that indicates a first warning condition. The first warning condition may, for example, be a first warning light on the display 125. The latch 213 is reset by a key-on signal when the ignition is turned on, thereby turning off the first warning light or other indication.

The switch 205 output is also input to a third comparator 215, which compares the switch output, typically the difference value, to a third limit, L3. When the switch output is less than or equal to L3, the third comparator 215 outputs a "1" that initiates a second timer 217. The second timer 217 stops when a "0" is output from the third comparator 215, indicating that the switch output is no longer less than or equal to L3. The output from the second timer 217 is a second run-time, the length of time the second timer 217 was on, i.e., had an input of "1." The output of the second timer 217 is input to a fourth comparator 219, that compares the second run-time to a fourth limit, L4. When the second run-time is greater than L4, the fourth comparator 219 outputs a "1" that sets latch 221 that indicates a second warning condition. The second warning condition may, for example, be a second warning light on the display 125. The latch 221 is reset by a key-on signal when the ignition is turned on, thereby turning off the second warning light or other indication.

The various limits L1, L2, L3, or L4, are characteristic of the particular type of engine and are found, and calibrated by performing engine tests with a dynamometer, or other device. The limits are stored in the ECM 115 and may be fixed or modifiable values. The significance of the limits may be as follows. For example, L1 may be a pressure difference that represents a low pressure condition that may be caused by a mechanical problem, such as a fuel pump failure or a large fuel leak, L2 may be a minimum time for the L1 pressure difference to be considered a problem, L3 may be a pressure difference that represents a high pressure condition that may be caused by a mechanical problem, such as a malfunctioning fuel pressure regulator, and L4 may be a minimum time for the L3 pressure difference to be considered a problem.

A flowchart that illustrates a method for use with a fluid filter in an internal combustion engine is shown in FIG. 3. At step 301, a measured fluid pressure is obtained. The measured fluid pressure may be derived from or taken from data obtained by sensor(s) 113. Although one sensor 113 may be utilized near either the inlet 109 or the outlet 111 or one near each location, advantage may be obtained by utilizing one sensor 113 near the outlet 111. For example, one sensor is less expensive than two sensors. Another advantage is that a sensor 113 at the outlet 111 measures fuel pressure adjacent to the fuel rail 105, and may be used to facilitate reliable operation of the engine 101. For example, reliable operation of the engine 101 may depend on maintaining a desired fuel pressure in the fuel rail 105 to insure fuel flow to the cylinder block 107. A sensor 113 at the outlet 111 may be utilized to warn an operator of a low pressure condition before the fuel rail 105, which condition may result in an imminent loss in engine performance.

At step 303, the predetermined value for the filter 113 is determined from engine operating parameters as described above. At step 305, the predetermined value from step 303 is compared to the measured fluid pressure obtained in step 301. For example, the difference between the measured fluid pressure and predetermined value may be calculated. At step 307, the difference from step 305 is compared to an established value. For example, the difference found in step 305 may be compared to an established value that may, for example, be a tolerated amount of pressure difference. The comparison in step 307 may include one or more mathematical operations and/or steps, such as subtraction, taking of absolute values, mathematical data filtering, numeric comparisons, and so forth. Alternatively, the comparison may include the mathematical operations or steps of data trending or date accumulation.

At step 309, it is determined whether one or more warning conditions exist. When the results of the comparison of step 305 exceed an established value at step 309, a warning condition may be presumed to exist. For example, as the filter 103 becomes more obstructed, the pressure drop across the filter 103 increases, as does the deviation of the measured pressure from the predetermined value. The pressure drop may be detected by utilizing two sensors 113, one near the inlet 109 and one near the outlet 111 of the filter. Advantageously, a single pressure sensor 113, either near the inlet 109 or the outlet 111 of the filter, may less expensively determine whether the filter 103 has begun to or is clogged. As flow through the filter 103 becomes more restricted, the pressure near the outlet 111 of the filter decreases as the pressure near the inlet 109 of the filter increases. These increased or decreased pressures may be utilized at step 309 to determine if their deviation is more than an established value associated with acceptable filter operation. Engine parameters, such as speed and load, will also affect the flow through the filter 103, and are taken into account by the predetermined value. If there is no warning condition at step 309, the method continues with step 301.

If a warning condition is found at step 309, an indication of warning is provided at step 311. Notification may be provided for an operator in a vehicle housing the engine 101. For example, such notification may include a signal or message sent to the display 125 in a driver's station of the vehicle. The display 125 may be controlled, for example, by the ECM 115. The driver's station, such as the cab of a truck or the driver's area of an automobile, may include various different displays, including the dashboard, part of a console, part of the steering wheel or column, overhead displays, and displays that are projected onto a windshield. The notification may include, for example, illuminating a light on a display, displaying a visual message comprised of symbols or letters, such as "ATTENTION: LOW FUEL PRESSURE" or"FUEL FILTER WARNING" conveying a verbal or audio message, and so forth. Instructions, such as "CHECK FUEL FILTER," "SERVICE SOON," or "ACTION REQUIRED" may be directed to the operator. The operator of the vehicle may be the current driver of the vehicle or other personnel concerned with the operating status of the vehicle. Alternatively, notification of the warning condition may be communicated by the ECM 115 to a radio frequency transmitter 127 for the transmission of the warning condition to a remote location, such as a maintenance garage.

Although the present invention is illustrated by the example of a diesel engine having six cylinders, the present invention may be applied to: engines having one or more cylinders, including those with less than or greater than six cylinders; various engine types, such as I-4, I-6, V-6, V-8, and so forth; engines having different cylinder firing orders; diesel engines, gasoline engines, or other types of engines; turbocharged and non-turbocharged engines; and engines of any size. The present invention may also be applied to a variety of filtered fluids other than diesel fuel.

The present invention provides a number of advantages. More reliable detection of clogs in fluid filters, for example, in internal combustion engines, such as fuel filters, oil filters, and so forth. Engine operating costs are reduced because of filters are replaced as needed and unnecessary filter replacements are reduced. Engine operating costs are reduced because downtime costs due to unnecessary filter replacement are reduced. The use of a single pressure sensor reduces manufacturing costs of systems that use multiple sensors. A more reliable determination of filter clogging as compared to techniques that rely solely on visual inspection is provided. The invention is also applicable to filters in other fluid systems, such as swimming pools or large fluid storage tanks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
    obtaining a measured fluid pressure near a fluid filter in an internal combustion engine:
    determining a value based on engine speed, engine load, and fluid temperature;
    comparing the measured fluid pressure to the value, yielding a compared pressure;
    when the compared pressure exceeds an established value, indicating that a potential fluid filter problem is present.

2. The method of claim 1, further comprising the step of activating at least one timer based on indication of the presence of a potential fluid filter problem.

3. The method of claim 1, wherein the fluid is at least one of gasoline, diesel, and oil.

4. The method of claim 1, wherein the measured fluid pressure is taken near an outlet of the filter.

5. The method of claim 1, wherein the measured fluid pressure is taken near an inlet of the filter.

6. The method of claim 1, wherein the potential fluid filter problem is at least one of an obstruction, a restriction, and clogging in the filter.

7. The method of claim 1, wherein the potential fluid filter problem causes an imminent loss in engine performance.

8. A method comprising the steps of:
    obtaining a measured fluid pressure near a filter in an internal combustion engine; determining a value that is based on engine speed, engine load, and fluid temperature;
    determining a difference between the value and the measured fluid pressure; and
    determining whether to indicate a warning condition for the filter based on the difference.

9. The method of claim 8, wherein the measured fluid pressure is taken near an outlet of the filter.

10. The method of claim 8, wherein the measured fluid pressure is taken near an inlet of the filter.

11. The method of claim 8, further comprising the steps of comparing the difference to at least one predetermined value, and activating at least one timer based on the difference.

12. The method of claim 8, further comprising the step of indicating the warning condition.

13. The method of claim 8, further comprising the step of communicating the warning condition to a radio frequency transmitter for transmission to a remote location.

14. An apparatus comprising:
    a pressure sensor arranged and constructed to measure a pressure of a fluid near a filter for the fluid of an internal combustion engine, yielding a measured fluid pressure;

an engine control module arranged and constructed to determine a value based on engine speed, engine load, and fluid temperature, and to compare the value to the measured fluid pressure, and based on results of the comparison, to indicate a warning condition for the filter.

15. The apparatus of claim 14, wherein the pressure sensor is located in the fluid near at least one of a discharge of the filter and an inlet of the filter.

16. The apparatus of claim 14, further comprising a display for indicating the warning condition for the filter when the results of the comparison exceed an established value.

17. The apparatus of claim 14, further comprising a timer arranged to be activated based on the results of the comparison.

* * * * *